United States Patent Office 3,506,632
Patented Apr. 14, 1970

3,506,632
PREPARATION OF PLASTICS
James Neil Henderson, Hudson, Ohio, assignor to The Goodyear Tire & Rubber Company, Akron, Ohio, a corporation of Ohio
No Drawing. Continuation-in-part of application Ser. No. 425,085, Jan. 12, 1965. This application Apr. 15, 1968, Ser. No. 721,171
Int. Cl. C08d 3/10
U.S. Cl. 260—85.3                                9 Claims

ABSTRACT OF THE DISCLOSURE

The method disclosed comprises polymerizing mixtures of conjugated diolefins with internal olefins by means of a catalyst formed from (a) organoaluminum compounds such as aluminum trialkyls, or aluminum alkyl hydrides, (b) a reducible transition metal salt of titanium or vanadium such as titanium tetrachloride or vanadium acetyl acetonate and (c) an oxygenated compound selected from the group of organic peroxides, organic hydroperoxides, hydrogen peroxides, water, oxygen, ketones, aldehydes, quinones and alcohols. The polymerization is usually carried out as a solution polymerization in a diluent or solvent. The method results in copolymers of mixtures of conjugated diolefins with internal olefins in which the portion of the copolymer resulting from the conjugated diolefin is, in part, cyclic in structure. These copolymers contain rings usually having 5 or 6 carbon atoms and result in polymers having a lower degree of unsaturation and a higher density than the usual open chain polymers or copolymers. As a result, there is an extreme elevation of the glass transition temperature of such copolymers leading to a resinous non-crystalline material.

---

This application is a continuation-in-part of application Ser. No. 425,085 filed Jan. 12, 1965, now abandoned, for "Preparation of Plastics."

This invention relates to a process for the production of unique copolymers of diolefins which contain a cyclized structure. More particularly, it relates to copolymers of diolefins and internal olefins.

In recent years diolefins have been polymerized by means of stereospecific catalyst systems to form rubber-like materials which have a spatially oriented polymer structure. These processes are the result of the discovery of some highly unique catalyst systems. For instance, it is known that cis-1,4 polyisoprene can be prepared by means of a catalyst system comprising an organo metallic compound such as an aluminum trialkyl and a transition metal compound such as titanium tetrahalide. Likewise, it is known that cis-1,4 polybutadiene can also be prepared in a similar fashion. Both linear polyethylene and other polyolefins can be prepared by employing similar catalyst systems. Products of this invention are to be distinguished from the polymers heretofore known of which open-chain linearity has been the unique feature of the polymers and the polymerization systems employed.

Therefore, it is the object of this invention to provide new and different polymers resulting from conjugated diolefins. Another object is to provide processes for the preparation of cyclic copolymers from conjugated diolefins. Still a further object is to provide a copolymer of conjugated diolefins and internal olefins wherein the portion of the copolymer resulting from the conjugated diolefin is in part cyclic in structure.

The present invention resides in the discovery that conjugated diolefins may be polymerized or they may be copolymerized with internal olefins in the presence of novel catalyst systems to produce cyclopolydienes and copolymers of diolefins in mixture with internal olefins wherein the portion of the copolymer resulting from the conjugated diolefin is in part cyclic in structure. Cyclopolydiolefins are diolefin polymers in which a sizeable proportion of the monomer units is combined so as to form rings, particularly 5- and 6-membered rings, other than the completely open-chain polymers which result from 1,4, 3,4 or 1,2 modes of monomer addition. Since the formation of cyclopolydiolefins requires addition reactions which use up more than one double bond per monomer unit, these polymers have a lower degree of unsaturation and a higher density than open-chain polymers, which, in the absence of further reactions, retain only one double bond per monomer unit. One particularly useful result of having cyclic structures in the polymers is an extreme elevation of the glass transition temperature, so that at ordinary temperatures the polymers are plastics rather than rubbers. The invention therefore provides a method for converting diolefins, for example, isoprene to hard resinous non-crystalline materials whereas other modes of polymerization convert isoprene to substances which at room temperature are either rubbery or crystalline. Resinous, non-crystalline polyisoprene (including the cyclopolyisoprene and copolymers of this invention and cyclized polyisoprene resulting from natural rubber) is useful for use in heat-sealable paper-coatings, as paint and rubber reinforcing agents, in quick-drying printing inks, and the like.

Accordingly, the objects of this invention are realized by polymerizing conjugated diolefins or mixtures of conjugated diolefins with internal olefins in the presence of catalyst formed from (a) an organic aluminum compound of the formula:

wherein $R_1$ is an aliphatic hydrocarbon, $R_2$ and $R_3$ are selected from the group consisting of an aliphatic hydrocarbon and hydrogen; (b) a reducible transition metal salt selected from the group consisting of the salts of titanium and vanadium and (c) an oxygenated compound selected from the group consisting of organic peroxides and organic hydroperoxides, hydrogen peroxide, water, oxygen, ketones, aldehydes, quinones and alcohols.

The monomers employed to form the cyclopolymers of this invention are conjugated diolefins representative of which are isoprene, piperylene, 2-ethyl-1,3-butadiene; 2,3-dimethyl-1,3-butadiene; 1,3-butadiene and other 2,3-dialkyl substituted 1,3-butadienes and other 2-alkyl substituted 1,3-butadienes.

The internal olefins which are employed in the practice of this invention to form copolymers when used in conjunction with diolefins are mono olefins containing an internal double bond, and may be defined by the formula:

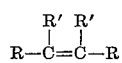

wherein R is an alkyl radical and R' is an alkyl radical or hydrogen. Representative of such olefins which contain a tetra substituted double bond are such olefins as 2,3-dimethyl-2-butene; 2,3-dimethyl-2-pentene; 3,4-dimethyl-3-hexene and the like. Representative of the olefins containing a tri substituted double bond are 2-methyl-2-pentene; 3-methyl-2-pentene; 2-methyl-2-butene and the like. Representative of olefins containing disubstituted double bonds are 4-methyl-2-pentene; 2-butene; 2-hexene; 2-pentene; 3-hexene and the like.

It is possible to obtain several compositions by the practice of the process of this invention. A copolymer consisting of diolefin units and internal olefin units wherein the conjugated diolefin derived units are in part cyclized may be produced. Also, a terpolymer may be produced which is similar to the copolymer but having in addition thereto, units derived from aromatic solvents which have an active nucleus. An example of such a copolymer is one prepared from isoprene and 2,3-dimethyl-2-butene. An example of such a terpolymer would be one prepared from isoprene, 2,3-dimethyl-2-butene and benzene. The percentage of units derived from each monomer in such copolymers and terpolymers may be varied by reaction conditions and tailored to meet the requirements of the end product by those reasonably skilled in the art. Particularly good copolymers have been obtained when from 10 to 60 mole percent of the internal olefin, based on the diolefin, is used.

The organo-aluminum compounds which form one component of the catalyst of this invention may be defined by the formula:

$$AlR_1R_2R_3$$

wherein $R_1$ is an aliphatic hydrocarbon, $R_2$ and $R_3$ are selected from the group consisting of an aliphatic hydrocarbon and hydrogen. Representative of but by no means limiting such organo-aluminum compounds are: diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolyl-ethyl aluminum hydride, p-tolyl-n-propyl aluminum hydride, p-tolylisopropyl aluminum hydride, benzylethyl aluminum hydride, benzyl-n-propyl aluminum hydride, benzylisopropyl aluminum hydride and other organo aluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethylphenyl aluminum, diethyl-p-tolyl aluminum, diethylbenzyl aluminum and other triorgano aluminum compounds.

Another component of the catalyst system of this invention is a reducible transition metal compound in which the metal is selected from the group consisting of titanium and vanadium. Representative of such materials are titanium tetraiodide, titanium tetrabromide, titanium tetrachloride, vanadium tetrachloride, vanadium oxytrichloride, vanadium acetyl acetonate, titanium oxydichloride, triisopropoxy titanium chloride, diisopropoxy titanium dichloride, vanadium dichloride and the like.

The third component employed as the catalyst of this invention is an oxygenated compound selected from the group consisting of organic hydroperoxides such as t-butyl hydroperoxide, $\alpha,\alpha'$-dimethylbenzyl hydroperoxide, 2-hydroperoxy-2-methoxypropane and the like; organic peroxides such as di-t-butyl peroxide, bis($\alpha,\alpha'$-dimethylbenzyl) peroxide and the like; ketones such as methylethyl ketone, diphenyl ketone, methyl phenyl ketone, p-benzoquinone and the like; aldehydes such as acetaldehyde, benzaldehyde and the like and alcohols such as methanol, 2-phenylpropan-2-ol (dimethyl phenyl carbinol or cumyl alcohol), t-butyl alcohol and the like.

In general the polymerization of the cyclo polymers of this invention is conducted as a solution polymerization. The monomers are polymerized by means of the catalyst while the monomers are dissolved in an inert solvent or diluent. By the term "inert solvent" or "diluent" is meant that the solvent or diluent does not substantially inhibit the polymerization process or have an adverse effect upon catalyst components. It may in some instances however, enter into the final structure of the resulting polymer and effect the properties thereof. Representative of such inert solvents or diluents are the paraffinic hydrocarbons such as pentane, hexane, heptane and the like; the acyclic hydrocarbons such as cyclohexane, substituted cyclohexanes and the like and the aromatic hydrocarbons such as benzene, toluene and xylene. Mixtures of these solvents may also be employed. Substituted hydrocarbons may be employed so long as the substituents are inert under the conditions of polymerization. Representative of such hydrocarbons are the chlorinated paraffinic hydrocarbons such as trichloroethylene, dichloroethane, chlorobenzene and the like. It has been found that the solvent/monomer volume ratio is not critical and may be varied over a relatively wide range; for instance, the solvent/monomer volume ratio may vary between no solvent up to 20/1. However, when solvent is used, it is usually preferable to utilize a ratio of from about 3/1 to about 10/1.

It should be appreciated that certain solvents which may be usefully employed in these polymerizations will actually enter into the polymer chain while others will not. The solvents which do not enter into the polymer are the aromatic solvents having a deactivated nucleus, (i.e. those having electron withdrawing substituents on the nucleus) such as chlorobenzene, nitrobenzene, bromobenzene, benzotrifluoride, benzo-trichloride, and the like. Aliphatic solvents and aromatic solvents having an active nucleus such as benzene and toluene will enter into the polymer chain to some extent. Those skilled in the art will of course select the solvent most compatible with the product desired.

Polymerizations to which this invention is directed may also be carried out in the absence of any inert solvent. This technique is known as bulk or mass polymerization and is well known in the art. Likewise, the polymerizations may be conducted either as batch or continuous polymerization techniques.

The pressures employed in the practice of this invention may vary widely from subatmospheric to super atmospheric with from about 5 to about 100 pounds per square inch absolute being more preferred. The temperature at which the polymerizations of this invention are conducted may vary widely from extremes of $-20°$ C. to $+100°$ C. with from about $10°$ C. to about $70°$ C. being more preferred.

The amount of catalyst employed in the practice of this invention may be varied rather widely. However, since certain impurities may react with the metal containing catalyst components, the operable range of catalyst concentration depends in part on the degree of purity of the reactants, particularly the solvent and the monomer. When the reactants were purified, as in the examples in this specification, it was determined that the lowest effective catalyst level calculated in terms of the transition metal component of the catalyst was approximately 1 millimole of transition metal per liter of polymerization mixture. Above 10 millimoles of transition metal per liter of polymerization mixture the reaction was undesirably vigorous. The most preferred catalyst level was about 2 millimoles of transition metal per liter of polymerization mixture. However, it should be understood that the amount of catalyst employed may best be determined by the requirements of those practicing this invention. With purer reactants the operable range and the preferred level, of course, will usually be lower. Also, the preferred ratio of the oxygen containing material to either of the other catalyst components would probably be lower with less pure materials, particularly if the impurities were oxygen or oxygen containing compounds.

The mole ratio of organo aluminum compounds to transition metal compounds when employed as catalysts of this invention may vary widely from about 0.2/1 to about 5/1 with from about 0.3/1 to about 1/1 being more preferred. The atomic ratio of the oxygen in the oxygenated compound to aluminum may vary widely from about 0.8/1 to about 4/1 with from about 1.5/1 to about 2.5/1 being more preferred.

The following examples are illustrative of one suitable procedure for the preparation of the novel compositions of the present invention. It will be understood that various changes may be made with reference to the selection of inert hydrocarbons, ingredients, proportions of ingredients and various details of procedure without in any way departing from the principles of this invention.

EXAMPLE I

Polymerization grade isoprene in a thiophene free benzene solution was purified by passage through baked chromatographic grade alumina and baked silica gel under the pressure of lamp grade nitrogen.

To a reaction vessel were added 80 ml. of this purified isoprene/benzene solution containing 10 grams of isoprene and 0.60 ml. of a heptane solution of triisobutyl aluminum (0.26 millimole). Pure oxygen (0.26 millimole) and 0.65 ml. of a heptane solution of titanium tetrachloride ($TiCl_4$) (0.26 millimole) were then added to the reaction vessel. Addition of the titanium solution produced a clear yellow color which remained unchanged during 98 hours standing at room temperature. It was apparent that the viscosity of the solution increased during the first 16 hours of reaction, but after that time further changes were not observed. After 98 hours the reaction was discontinued by the addition of tetraethylene pentamine as a catalyst deactivation agent and an aromatic amine as an antioxidant in benzene solution and the entire mixture was then precipitated in methanol the polymer was settled by means of a centrifuge and produced a white mass which upon separation and vacuum drying was found to be a rigid plastic weighing 4.2 grams for a 42% conversion. The supernatant liquor remaining after centrifugation was evaporated to dryness in air leaving an oily residue which after correction for antioxidant and catalyst residues weighed 0.4 gram or 4% conversion. The solid polymer when heated on a Fisher Johns Melting Block with the application of intermittent mechanical pressure had a plastic softening range at 65 to 85° C. The inherent viscosity of a 1% solution in benzene at 30° C. was taken as a measure of the molecular weight and produced an I.V. value of 0.2 dl./g. grams per cc. The density of the solid polymer was 0.981 gram per cc.

EXAMPLE II

In this example 69 ml. of an isoprene/benzene solution purified as in Example I and containing 10.2 grams of isoprene was added to a polymerization vessel. To this solution was added 14 ml. of a benzene solution of water (0.45 millimole), 0.72 ml. of a heptane solution of triisobutyl aluminum (0.26 millimole), and 0.70 ml. of a heptane solution of titanium tetrachloride ($TiCl_4$) (0.72 millimole). Upon addition of the titanium solution a yellow color was produced which after tumbling in a constant temperature bath at 50° C. deepened to a slightly hazy pale brown. An increase in the viscosity of the solution was apparent during the first hour of reaction, but after that no further thickening was detected and the solution remained mobile. After 67 hours the bottle was allowed to cool to room temperature and the reaction was terminated by the addition of the catalyst deactivation agent and an antioxidant in a benzene solution. After coagulation in methanol and drying 7.8 grams of solid polymer or 77% conversion was recovered and 1.0 gram of a methanol-soluble oligomer or 10% conversion was recovered. Physical properties obtained in the same manner as Example I showed a plastic softening range of 60 to 110° C., an IV of 0.1 and a density of 0.96 gram per cc. Unsaturation was measured by an iodine monochloride titration, which with a correction for hydrogen chloride evolved showed unsaturation of 32%.

EXAMPLE III

In this example 80 ml. of an isoprene/chlorobenzene solution of 10 grams of isoprene was placed in a reaction vessel. To this was added 1 ml. of a pentane solution of cumyl hydroperoxide (0.13 millimole), 0.60 ml. heptane solution of triisobutyl aluminum (0.26 millimole), and 0.65 ml. of heptane solution of $TiCl_4$ (0.26 millimole). The reaction was allowed to continue for 18 hours after which time it was terminated by the addition of a catalyst deactivation agent and an antioxidant in a benzene solution. After coagulation in methanol and drying, 5.3 grams of solid polymer was recovered for a 53% conversion and 0.4 gram of a methanol-soluble oligomer for 4% conversion were recovered. Physical properties were obtained as before and showed a softening range of 85 to 105° C., IV of 0.14.

EXAMPLE IV

In this example 80 ml. of isoprene was placed in the reaction vessel and boiled until about 5% of the isoprene had been removed. At this point a 0.5 ml. pentane solution of cumyl hydroperoxide (0.065 millimole) was added along with 0.36 ml. of a heptane solution of triisobutyl (0.13 millimole) and 0.34 ml. of a heptane solution of $TiCl_4$ (0.13 millimole). The reaction was allowed to continue for 17 hours in a constant temperature bath of 50° C. with continuous agitation. The reaction was terminated and the polymer coagulated as in the previous examples and 7.1 grams of solid polymer was recovered for a 15% conversion and 0.7 gram of a methanol-soluble oligomer was recovered for 2% conversion. Physical properties obtained according to the previous examples showed a plastic softening range of 30° to 50° C. and an IV of 0.3.

EXAMPLE V

This experiment was conducted in the same manner as Example IV except that a 0.5 ml. of a heptane solution of 2-butoxy-2-hydroperoxypropane solution (0.065 millimole) was used in place of the cumyl hydroperoxide of Example IV. This reaction was allowed to continue for 89 hours and after processing 1.2 grams of solid polymer was recovered for a 12% conversion and 0.2 gram of a methanol-soluble oligomer was recovered for a 2% conversion. The plastic softening range of this polymer was 30° to 55° C., an IV of 0.1 and the density was found to be 0.979 gram per cc.

EXAMPLE VI

This experiment was conducted in the same manner as Example IV except that a catalyst was used that comprised 1.0 ml. of a pentane solution of di-tertiary butyl peroxide (0.13 millimole), 0.17 ml. of a heptane solution of triisobutyl aluminum (0.065 millimole) and 0.66 ml. of a heptane solution of $TiCl_4$ (0.26 millimole) was used. After 137 hours the reaction was terminated as before except that no antioxidant was added. 0.9 gram of solid polymer was recovered for a 9% conversion and 0.3 gram of a methanol-soluble oligomer was recovered for a 3% conversion. The solid polymer had a plastic softening range of 80° to 100° C. and an IV of 0.1.

EXAMPLE VII

In this example 80 ml. of a pentane/isoprene solution containing 27 grams of isoprene was added to the reaction vessel. To this was added a catalyst comprising 1 ml. of a pentane solution of methanol (0.26 millimole), 0.72 ml. of a heptane solution of triisobutyl aluminum (0.26 millimole), and 0.68 ml. of a heptane solution of $TiCl_4$ (0.26 millimole). The reaction was allowed to continue for 24 hours as in previous examples and after processing 7.8 grams of a solid polymer was recovered for a 29% conversion and 0.3 gram of a methanol-soluble oligomer was recovered for 1% conversion. The solid polymer had a plastic softening range of 75 to 100° C. and an IV of 0.15.

EXAMPLE VIII

This experiment was conducted in accord with the procedure of Example IV except that in this example 80 ml. of a solution of isoprene and 2,3-dimethyl-2-butene and normal pentane containing 8.2 grams of isoprene and 5.8 grams of 2,3-dimethyl-2-butene was added to a reaction vessel. 5% of this mixture was boiled off before adding a catalyst comprising 1 ml. of a pentane solution of cumyl hydroperoxide (0.13 millimole), 0.32 ml. of a heptane solution of triisobutyl aluminum (0.13 millimole) and 0.34 ml. of a heptane solution of TiCl$_4$ (0.13 millimole). The reaction vessel was then placed in a constant temperature bath of 50° C. and tumbled for 166 hours. After this period the reaction was terminated as in the previous examples. 3.1 grams of solid polymer was recovered and 1.33 grams of a methanol-soluble oligomer recovered after coagulation and drying. This resulted in a 22% conversion of the solid polymer in a 10% solution of the liquid polymer based on the weight of both monomers in neglecting monomer loss and purification. The solid polymer showed a plastic softening range of 40 to 60° C. and an IV of 0.1 and an infra-red analysis was made of both the solid and liquid polymers with the following results. In addition to the presence of all the infrared adsorption bands typically associated with cyclo-polyisoprenes peaks were also registered at from 7.1 to 7.3, 8.1 to 8.2 and 8.4, 9.5, 10.1, 10.2, and 10.7. The adsorption bands that were found that are not typical of the cyclopolyisoprenes is attributed to the presence of units of 2,3-dimethyl-2-butene in the polymer chain. Nuclear magnetic resonance analysis of the polymer showed the following proportions of hydrogen types: 64% on carbon which is bonded to saturated carbon; 18% in methyl groups which is bonded to unsaturated carbon; 11% in methylene groups bonded to unsaturated carbon; 6% on unsaturated carbon. These proportions are consistent with the copolymer composition in which isoprene/2,3-dimethyl-2-butene ratio is close to 2 to 1.

While certain representative embodiments and details have been shown for the purpose of illustrating this invention, it will be apparent to those skilled in the art that various changes and modifications may be made therein without departing from the spirit or scope of the invention.

What I claim is:

1. A method for the preparation of resinous, non-crystalline interpolymers of conjugated diolefins with internal olefins having the formula

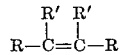

wherein R is an alkyl radical and R' is an alkyl radical or hydrogen, which comprises polymerizing mixtures of at least one conjugated diolefin and at least one internal olefin, having the formula

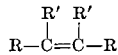

wherein R is an alkyl radical and R' is an alkyl radical or hydrogen, under solution polymerization conditions, while said mixtures are dissolved in an inert, solvent, by contacting said mixtures with a catalyst comprising (A) an organoaluminum compound with the formula

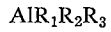

wherein R$_1$ is an aliphatic hydrocarbon, R$_2$ and R$_3$ are selected from the group consisting of an aliphatic hydrocarbon and hydrogen; (B) a reducible transition metal salt selected from the group consisting of the salts of titanium and vanadium and (C) an oxygenated compound selected from the group consisting of organic peroxides, organic hydroperoxides, hydrogen peroxide, water, oxygen, ketones, aldehydes, quinones and alcohols, wherein the ratio of organoaluminum compound to transition metal salt is at least 0.2/1 and not substantially greater than 5/1 and the atomic ratio of the oxygen in the oxygenated compound to aluminum is greater than 0.8/1 but does not exceed 4.0/1.

2. A method according to claim 1 wherein the organoaluminum compound is an aluminum trialkyl.

3. A method according to claim 1 wherein the reducible transition metal salt is a titanium salt.

4. A method according to claim 1 wherein the oxygenated compound is cumyl hydroperoxide.

5. A method according to claim 1 wherein the oxygenated compound is oxygen.

6. A method according to claim 1 wherein the oxygenated compound is cumyl alcohol.

7. A composition according to claim 9 wherein the internal olefin is a tetrasubstituted ethylene.

8. A composition according to claim 9 wherein the conjugated diolefin is isoprene and the internal olefin is 2,3-dimethyl-2-butene.

9. A composition of matter comprising a copolymer of a conjugated diolefin and an internal olefin prepared according to the process of claim 1.

References Cited

UNITED STATES PATENTS 3,070,587 12/1962 Zelinski _____ 260—94.3
3,157,627 11/1964 Friedlander _____ 260—94.9
3,163,611 12/1964 Anderson _____ 252—429

FOREIGN PATENTS 662,850 5/1963 Canada.

JOSEPH L. SCHOFER, Primary Examiner

R. A. GAITHER, Assistant Examiner

U.S. Cl. X.R.

260—80.7, 82.1